(No Model.) 2 Sheets—Sheet 1.
P. C. PAGETT.
DIE FOR FORMING PLOW POINTS AND MOLD BOARDS.
No. 429,543. Patented June 3, 1890.
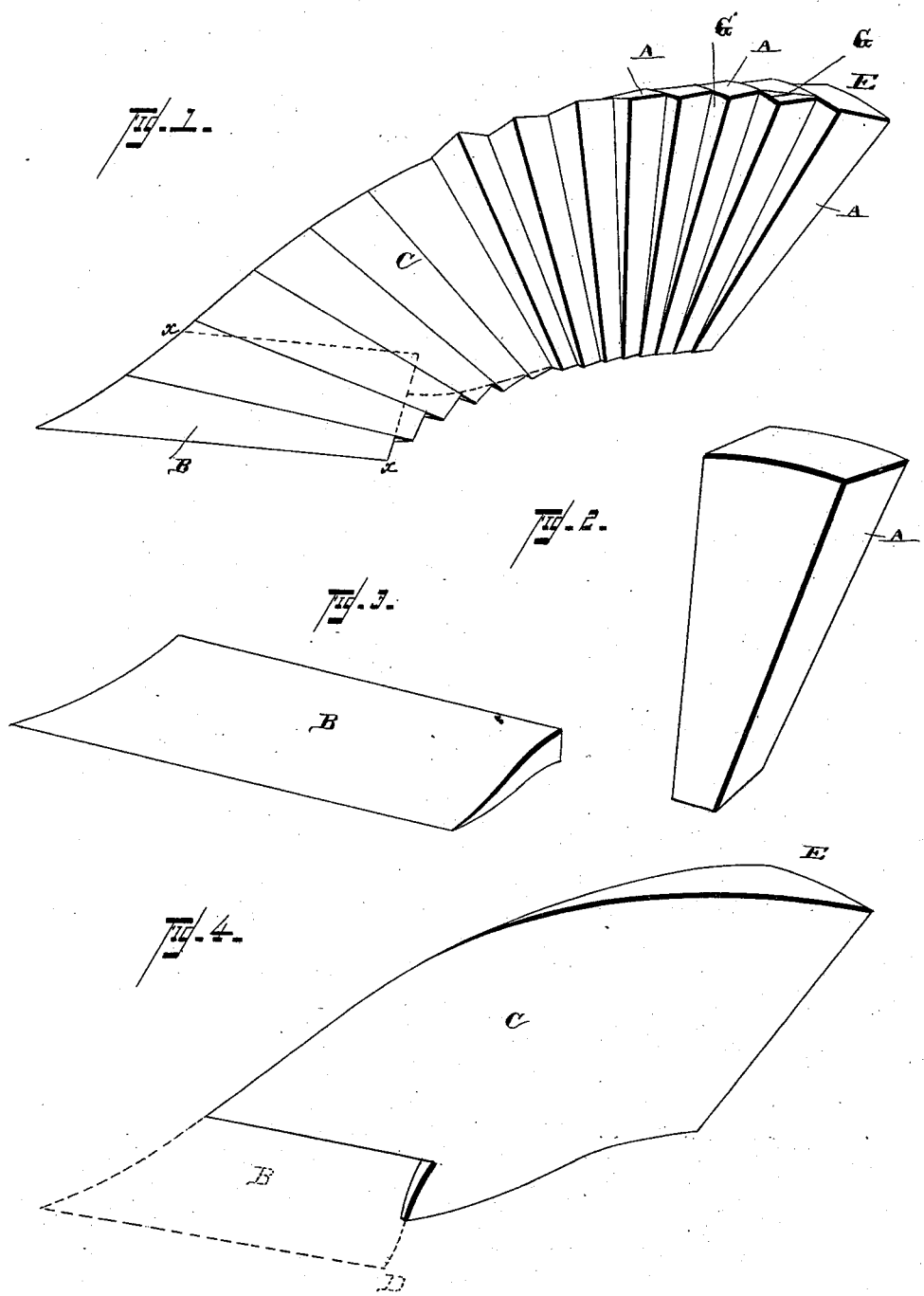
WITNESSES:
F. L. Ourand
Arthur L. Morsell
INVENTOR:
Philip C. Pagett,
by Sams Dagger & Co,
Attorneys.

(No Model.) 2 Sheets—Sheet 2.
P. C. PAGETT.
DIE FOR FORMING PLOW POINTS AND MOLD BOARDS.
No. 429,543. Patented June 3, 1890.
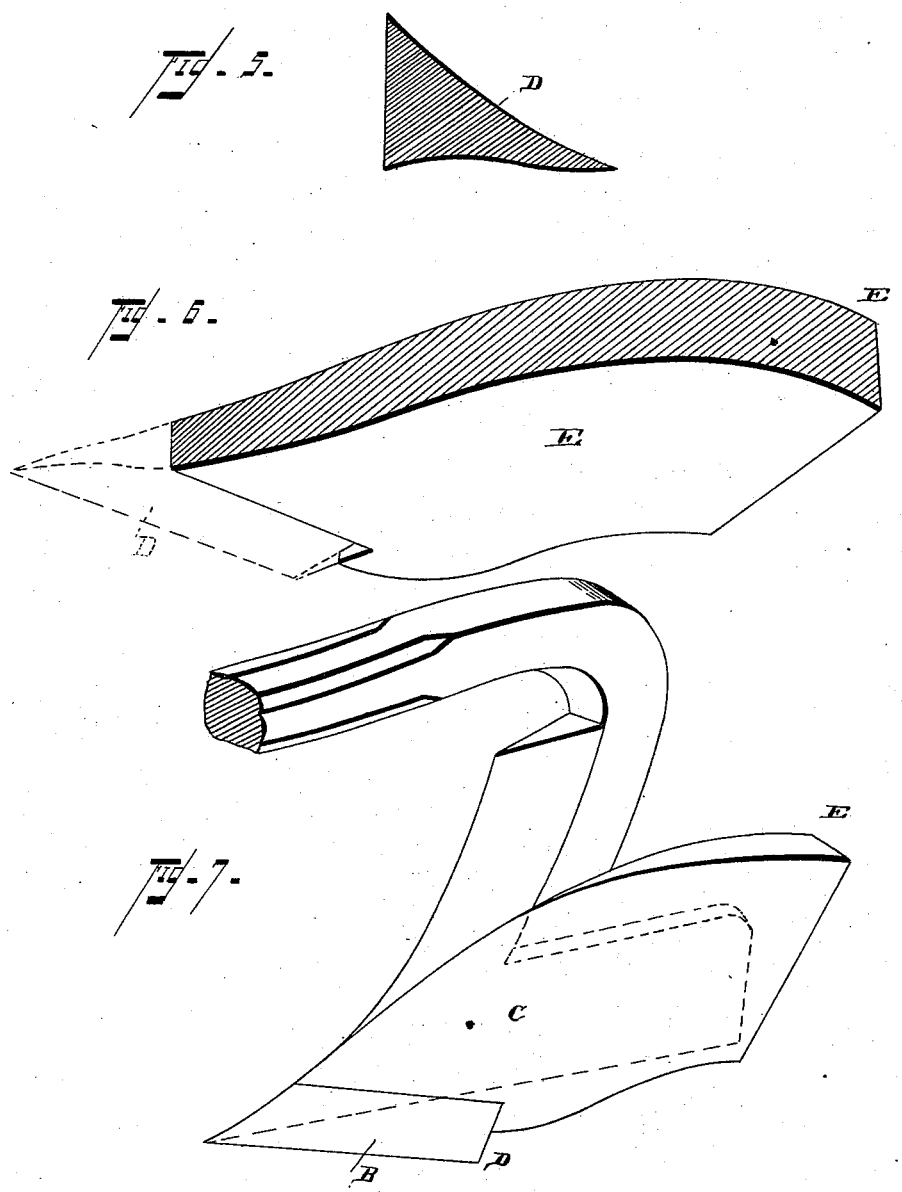
WITNESSES:
INVENTOR:

UNITED STATES PATENT OFFICE.

PHILIP C. PAGETT, OF WILMINGTON, OHIO.

DIE FOR FORMING PLOW-POINTS AND MOLD-BOARDS.

SPECIFICATION forming part of Letters Patent No. 429,543, dated June 3, 1890.

Application filed March 18, 1890. Serial No. 344,378. (No model.)

*To all whom it may concern:*

Be it known that I, PHILIP C. PAGETT, a citizen of the United States, and a resident of Wilmington, in the county of Clinton and State of Ohio, have invented certain new and useful Improvements in Plows; and I do hereby declare that the following is a full, clear, and exact description thereof, which will enable others skilled in the art to which it appertains to make and use the same.

My invention has relation to improvements in dies for forming plow-points and moldboards.

The object of the invention is to provide dies capable of forming plow-points and mold-boards of such shape that when connected will not only possess the greatest amount of strength, but at the same time reduce the draft to the minimum.

With this object in view the invention consists in constructing the dies of a series of overlapping sectors radiating from an ogee curve, as will be hereinafter fully set forth and described.

In the accompanying drawings, Figure 1 is a perspective view of a die in the process of construction, looking from the direction corresponding to the furrow side of a plow, and showing the die before being separated, so as to form the separate plow-point die and moldboard die, and also showing a portion of the angular projections ground or dressed off, so as to illustrate the manner of adjusting the several sections. Fig. 2 is a detail view of one of the sectors. Figs. 3 and 4 are detail views of a die when cut on the plane indicated by the line *x x*, Fig. 1, so as to form a separate plow-point die and mold-board die. Figs. 5 and 6 are cross-sectional views illustrating the cameo-share die and mold-board die, and Fig. 7 is a perspective view of a connected share and mold-board.

Like letters of reference refer to like parts throughout the several views.

In the operation of constructing the dies, I first provide a series of sections A, and overlap and adjust the same so that they form, when connected, approximately sectors radiating from an ogee curve, or the entire series of connected sections may be described as a sigmoidal bend or flexure. The angular projections thus formed by connecting these sectors are now ground off upon the side corresponding to the furrow side of the plow, so as to produce plane coinciding surfaces along said entire side. To illustrate this construction clearly, I have shown in Fig. 1 of the drawings a portion of the sections ground off, as just described, while the other portion is left with the projecting angles. After the above the connected sections are cut off at the line *x x*, Fig. 1, to form the share or plowpoint intaglio-die B. The balance of the connected sectors form the intaglio mold-board die C.

The cameo-dies are formed in an exactly analogous manner to the intaglio-dies just described, the share cameo-die being indicated by the letter D and the mold-board cameo-die by the letter E. These dies, however, have their surfaces which correspond to the landside of a plow, also ground off smooth, while the intaglio-dies may or may not have these surfaces ground off, as desired, all that is necessary in the latter dies being that the surfaces upon which the iron to be swaged rests is smooth and flush. These dies are clearly indicated in the sectional views Figs. 5 and 6 of the drawings.

After the dies are constructed as above set forth the iron to be shaped into the share is welded to the landside-piece and then placed between the two dies B and D, and by any suitable pressure is given the desired configuration. The iron to be formed into the mold-board is next placed between the dies C and E and in a similar manner given the desired form or shape. The share and moldboard thus formed are now connected together in any suitable manner, and a superior equal-pressure plow is produced, the complete plow being indicated in Fig. 7 of the drawings. It will be observed that when thus attached the landside is parallel with the furrowside, by which the bottom edge of the sod is not pressed out, but stands on its edge as it turns until it reaches the perpendicular, indicated by the line marked G, Fig. 1, upon the mold-board, when it is tipped by the twist of the mold-board and turns as if it were hinged to the ground at the bottom, thus making the draft exceedingly light. It will thus be seen that a plow-point or share and mold-board constructed by my improved dies present a decided advantage.

Having thus described my invention, what I claim, and desire to secure by Letters Patent of the United States, is—

1. A die for forming plow-points and mold-boards, consisting of the cameo and intaglio sections formed of a series of sectors radiating from an ogee curve cut on the plane indicated by the line $x\ x$, so as to form separate plow-point intaglio and cameo dies and separate mold-board intaglio and cameo dies, substantially as set forth.

2. A die for forming plow-points and mold-boards, consisting of the cameo and intaglio sections, formed of a series of overlapping sectors radiating from an ogee curve and having their faces ground off or dressed, so as to form plane coinciding surfaces, and also cut or severed on the plane indicated by the line $x\ x$, so as to form separate plow-point intaglio and cameo dies and separate mold-board intaglio and cameo dies, substantially as set forth.

In testimony that I claim the foregoing as my own I have hereunto affixed my signature in presence of two witnesses.

PHILIP C. PAGETT.

Witnesses:
J. M. KIRK,
JESSE H. KIRK.